United States Patent Office 3,823,204
Patented July 9, 1974

3,823,204
ACID DYE DYEABLE ACRYLONITRILE COPOLYMER, FIBERS THEREOF AND PROCESS FOR THE PREPARATION THEREOF
Hisao Okada, Eizo Ohta, Takeji Otani, Michimasa Beppu, and Hiroaki Yoneyama, Hiroshima, Japan, assignors to Mitsubishi Rayon Company Ltd., Tokyo, Japan
No Drawing. Filed Aug. 2, 1972, Ser. No. 277,200
Claims priority, application Japan, Aug. 16, 1971, 46/62,166
Int. Cl. C08f 29/56
U.S. Cl. 260—898                     7 Claims

ABSTRACT OF THE DISCLOSURE

An acid dye dyeable copolymer of acrylonitrile, an amino group containing monomer and a quaternary ammonium salt containing monomer, fibers prepared therefrom and a process for preparing the copolymer and the fibers are disclosed. Also disclosed are blends of said copolymer with other copolymers of acrylonitrile.

BACKGROUND OF THE INVENTION (1) Field of the Invention

This invention relates to an acrylonitrile copolymer, to fibers obtained therefrom, and to a process for preparing the acrylonitrile copolymer. More particularly, the invention relates to an acrylonitrile copolymer which is readily dyeable with an acid dye and has superior thermal stability, and fibers prepared from the copolymer.

(2) Description of the Prior Art

Acrylic fibers have previously found a wide variety of applications in apparel, interior decoration and other related fields because they can be dyed vividly, predominantly with basic or cationic dyes, and have an appearance and feel resembling those of wool. In recent years, the development of acrylic fibers having an acid dyeability has been under way. Since these fibers have begun to acquire a significant status as materials for dyeing in different colors or for blending with wool, the development of acid dyeable acrylic fibers is of great significance.

It is well known that the use of a basic unsaturated monomer such as methyl vinyl pyridine as one component of an acrylonitrile copolymer is very advantageous to impart acid dye receptivity to fabricated articles of such a copolymer, for example, fibers or films. Therefore, a number of basic monomers have been provided so far.

The greatest defect of acrylonitrile copolymers containing units derived from such a basic monomer is that these copolymers discolor upon heating, and the mechanical properties of fibers made theerfrom are degraded markedly. These difficulties frequently occur both in the process of making the fibers or in the process of handling fibrous products made therefrom.

A second defect is that the dyeability of a copolymer or fibers made therefrom with acid dyes depends greatly upon the pH of the dye bath used. Since acrylic fibers containing units derived from a basic monomer can be dyed satisfactorily only in a pH range as low as 2 to 4, the types of usable dyes are limited, and the fibres are damaged considerably because of the necessity for dyeing in a very low pH range. Furthermore, the acrylic fibers are not suitable for dyeing them in different colors. Any acrylic fibers containing units derived from a basic monomer have these dyeing properties, and generally, the extent of their pH dependence is determined by the basicity of the basic monomer. This fact already has been confirmed experimentally, and for example, acrylic fibers containing units derived from a vinyl monomer containing an aliphatic tertiary amine have a smaller pH dependence than acrylic fibers containing units derived from a vinyl pyridine type monomer.

On the other hand, an acrylonitrile copolymer containing as one component thereof a quaternary ammonium salt derivative of a basic monomer of fibers made therefrom have very good dyeing properties, and there is hardly any dependence of their dyeing properties upon the pH of the dye bath used. Since such an acrylonitrile copolymers or fibers thereof have very superior dyeing properties with a dye bath having a wide pH range of from 2 to 8, such fibers can be utilized very widely. This advantage can be ascribed to the fact that the quaternary ammonium salt is ionically bonded directly to the acid dye without the aid of hydrogen ions in the dye bath.

Furthermore, the quaternary ammonium salt has a high affinity for acid dyes and a high rate of dyeing. Therefore, acrylic fibers containing a quaternary ammonium salt exhibit appropriate dyeability even in the form of a blend with wool.

From the standpoint of dyeing, the most advantageous and simplest method for producing acid dyeable acrylic fibers is to copolymerize acrylonitrile with a monomer containing a quaternary ammonium salt obtained by converting a basic group (amino group), which is a dyeable group, before dyeing. Accordingly, various quaternary ammonium salt compounds obtained by quaternizing a basic monomer by suitable methods have been disclosed, and a number of acid dyeable acrylic fibers have been proposed.

Many experiments and analyses which have been conducted indicate that these acrylonitrile copolymer fibers containing as one component a polymerizable quaternary ammonium salt are quite sensitive to heat, and have poorer heat stability than the above-described acrylonitrile copolymer fibers containing a basic group. For example, the whiteness and thermal stability of the fibers of such copolymer are very much degraded, and the products obtained have a very low commercial value. This reduction in whiteness of the fibers adversely affects the color of the dyed fibers, and results in impairing their good dyeability. It is surprising that such a defect is a general characteristic regardless of the type of quaternary ammonium salt used.

An object of this invention is to provide an acrylonitrile copolymer which is readily dyeable with acid dyes, which has a dyeability that has little dependence upon the pH of the dye bath, and which possesses superior whiteness and thermal stability, and fibers made therefrom.

Another object of this invention is to provide a method by which the very serious defects of the conventional acid dyeable acrylic fibers are eliminated.

A further object of the present invention is to provide a copolymer composition for producing acid dyeable acrylic fibers having excellent properties, and a method whereby such a copolymer can be produced with commercial advantage.

SUMMARY OF THE INVENTION

The acid dye dyeable acrylonitrile copolymer of this invention comprises (1) at least 70% by weight of acrylonitrile;
(2) an amino group containing monomer of the following formula (I), (II) or (III):

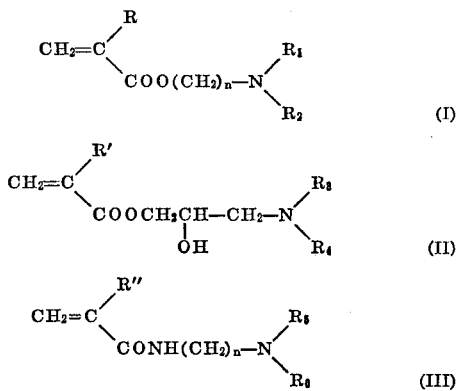

wherein R, R' and R" are each selected from the group consisting of a hydrogen atom and a methyl group, $R_1$, $R_2$, $R_3$, $R_4$, $R_5$ and $R_6$ are each selected from the group consisting of an alkyl group having from 1 to 8 carbon atoms, an aralkyl group having from 7 to 14 carbon atoms, in which said alkyl or said aralkyl group may be substituted with at least one cyano group or hydroxyl group, and $n$ is an integer of 2 to 4;

(3) a quaternary ammonium salt containing monomer of the following formula (I'), (II'), or (III'):

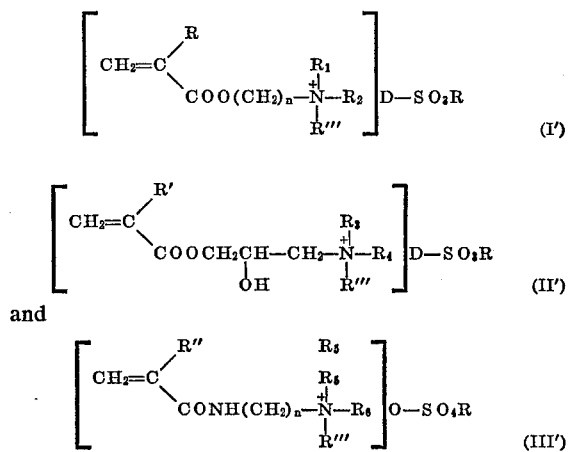

wherein R, R', R", $R_1$, $R_2$, $R_3$, $R_4$, $R_5$ and $R_6$ are as above defined, and R''' is a methyl group or an ethyl group, the total proportion of said amino group containing monomer plus said quaternary ammonium salt containing monomer ranging from 100 to 1,000 mmoles per kilogram of said acid dye dyeable acrylonitrile copolymer and the mole ratio of said amino group containing monomer to said quaternary ammonium salt containing monomer ranging from 2.3 to 0.25.

DETAILED DESCRIPTION OF THE INVENTION

As described above the acid dye dyeable acrylonitrile copolymer of this invention comprises acrylonitrile, an amino group containing monomer and a quaternary ammonium salt containing monomer. As a preferred embodiment of this invention the acid dye dyeable acrylonitrile copolymer of this invention further contains up to 19.1% by weight of another neutral vinyl monomer copolymerizable with acrylonitrile.

Suitable examples of the amino group containing monomer of formulas (I), (II), and (III) include the following monomers.

Examples of the monomer of the formula (I) include: dimethyl aminoethyl acrylate or methacrylate, dimethyl propyl acrylate or methacrylate, diethyl aminoethyl acrylate or methacrylate, diethyl aminopropyl acrylate or methacrylate, and dibenzyl aminoethyl acrylate or methacryalte.

Examples of the monomer of formula (II) include: 3-dimethylamino-2-hydroxypropyl acrylate or methacryalte, 3-diethylamino-2-hydroxypropyl acrylate or methacrylate, 3-dipropyl-2-hydroxypropyl acrylate or methacrylate, and 3-diethanolamino-2-hydroxypropyl methacrylate.

Examples of the monomer of formula (III) include: dimethyl aminopropyl acrylamide or methacrylamide, diethylaminopropyl acrylamide or methacrylamide, dibenzylaminopropylacrylamide or methacrylamide, and dimethylaminoethyl acrylamide or methacrylamide.

The quaternary ammonium salt containing monomer can be obtained by alkylating the amino group containing monomer and alkyl suflate having the formula $$(R'''O)_2SO_2 \qquad (IV)$$

wherein R''' is a methyl group or an ethyl group; e.g., dimethyl sulfate (where R''' is methyl) or diethyl sulfate (where R''' is ethyl). The quaternary ammonium salt containing monomer can be expressed by the above described formulas (I'), (II'), and (III'). The above specific examples of the amino group containing monomers can be quaternized using the alkyl sulfate as set forth above.

The method of synthesizing and isolating these quaternary ammonium salts is well known (for example, as disclosed in U.S. Pat. Nos. 3,214,370, 3,269,991, and 3,280,081), and can be carried out with relative ease.

The acid dye dyeable acrylonitrile copolymer of this invention contains from 100 to 1,000 mmols/kg. of the acid dye dyeable acrylonitrile copolymer, preferably 100 to 700 mmols/kg. of the acid dye dyeable acrylonitrile copolymer, of groups (dyeable groups) capable of being bonded to acid dyes. Generally, the dyeability of fibers with acid dyes is determined predominantly by the amount of dyeable groups, and the required amount of dyeable groups depends upon the use of the fibers, for example, depending upon whether the fibers are intended for different color dyeing or whether they are intended blending with wool.

When the acid dye dyeable acrylonitrile copolymer is blended with an conventional neutral acrylonitrile copolymer composed of at least 85% by weight of acrylonitrile and up to 15% by weight of another vinyl monomer copolymerizable with acrylonitrile (for example, as disclosed in U.S. Pat. Nos. 2,404,714; 2,566,255; 2,700,034; 3,523,150; and 3,558,765), it is possible to produce an acrylonitrile polymer and fiber thereof having very advantageously superior properties (especially, an excellent heat stability). In this case, it is frequently advantageous to incorporate at least 600 mmols per kilogram of dyeable groups. However, when the abovedescribed amino group containing monomer and quaternary ammonium salt containing monomer are introduced into an acrylonitrile polymer, the physical properties of the resulting copolymer deteriorate gradually with increasing amounts of the amino group containing monomer and quaternary ammonium salt containing monomer and various difficulties occur in the polymerization process. Generally, from the standpoint of the moldability of the polymer obtained, it is commercially advantageous to polymerize acrylonitrile in an aqueous medium. If the amounts of the amino group containing monomer and the quaternary ammonium salt containing monomer increase, the polymerization in the aqueous medium becomes non-uniform because of the greater affinity for water of these monomers in comparison with acrylonitrile. This results in the broadening of the molecular weight distribution and the composition distribution of the resulting copolymer i.e., the compositional make up of the copolymer obtained, and at the same time, the recovery, water washing and drying of the copolymer after completion of the copolymerization is carried out in an organic solution using a problems such as a considerable coloration of the polymer or a decrease in the rate of polymerization or in molecular weight arise, which are different from those which arise in the copolymerization of acrylonitrile in an aqueous medium. Therefore, the total proportion of the amino group containing monomer and quaternary ammonium salt containing monomer in the acid dye dyeable acrylonitrile copolymer is limited.

An extremely important feature of this invention is that the acid dye dyeable copolymer contains both the amino group containing monomer and the quaternary ammonium base containing monomer derivative thereof. A copolymre of acrylonitrile containing only the amino group containing monomer, or fibers made therefrom have a dyeability dependent upon the pH, and there has been no method by which this problem has been solved commercially.

As a result of various extensive studies in an effort to remove these defects, it has been found that an acrylonitrile copolymer and the fibers thereof which, in comparison with an acrylonitrile copolymer containing only the amino group containing monomer and the fibers thereof, scarcely suffer from any reduction in heat stability and have a reduced dyeability dependence upon the pH of the dye bath can be obtained by incorporating the quaternary ammonium salt containing monomer in an amount of from 0.435 to 4.0 molar times amount of the amino group containing monomer on a molar basis (the amount of the amino group containing monomer to the quaternary ammonium salt containing monomer=2.3 to 0.25). This procedure makes it possible to use dyes of varying types and to increase the adaptability to dyeing in different colors, for example, the adaptability to dyeing where cationic dyeable fibers and acid dyeable fibers of this invention are dyed in one bath in the copresence of a cationic dye and an acid dye.

Fibers containing both the amino group containing monomer and a small amount of the quaternary ammonium salt containing monomer can be sufficiently dyed at a pH ranging from 2 to 7, but it is preferred that the fibers to be dyed should have a smaller dyeability pH dependence than wool. In this sense, the essential amount of the quaternary ammonium salt containing monomer is 0.435 times the amount of the amino group containing monomer on a molar basis. On the other hand, when the quaternary ammonium salt containing monomer is increased, the heat stability of the copolymer or fibers barely changes up to the point at which the amount of quaternary ammonium salt containing monomer is 4.0 times the amino group containing monomer on a molar basis. But if the amount exceeds 4.0 times, the heat stability of the copolymer and fibers thereof abruptly decreases. If only the quaternary ammonium salt containing monomer is introduced, it is almost impossible to spin the copolymer without deteriorating the quality of the fibers, even when blended with other neutral acrylic polymers having a high heat stability.

The above results were obtained quite similarly irrespective of the types of the amino group containing monomer or the type of the alkyl sulfate, that is, whether it is dimethyl sulfate or diethyl sulfate.

If desired, other neutral vinyl monomers may be used in this invention in addition to the amino group containing monomer and the quaternary ammonium salt containing monomer. This additional compound is used for the purpose of increasing the operability of the polymerization and spinning steps or to impart other properties required for the fibers. As this monomer, neutral vinyl monomers which are copolymerizable with acrylonitrile and do not contain a polar group such as a basic group or an acid group are preferred. Specific examples of such neutral vinyl monomers are vinyl acetate, methyl acrylate, methyl methylacrylate, styrene, acrylamide, methacrylamide and derivatives of these materials, halogenated vinyl or vinylidene compounds such as vinyl bromide, vinyl chloride, vinylidene chloride or vinylidene bromide.

One important discovery of the present invention is that the heat stability of the copolymer decreases also with the introduction of the amino group containing monomer and the quaternary ammonium salt containing monomer in a very small amount into the copolymer, that is, up to 50 mmols/kg. of the copolymer, but when the total proportion of the amino group containing monomer plus the quaternary ammonium salt containing monomer is 100 to 1,000 mmols/kg. of the copolymer or the quaternary ammonium salt containing monomer is in the range of 50 to 300 mmol/kg. of the copolymer, the degree of heat stability deterioration is very small.

Thus, a second important feature of this invention is that when a copolymer having the highest possible dyeability (the total proportion of the amino group containing monomer plus the quaternary ammonium salt containing monomer=1,000 mmols/kg.) is prepared first, and then diluted with a conventional acrylonitrile polymer having a high heat stability, an acrylonitrile copolymer mixture which is dyeable with acid dyes and has excellent heat stability and fibers of this mixture can be obtained. It is clear at this time that the effect is greater with a higher degree of dilution with the conventional acrylonitrile polymer. As such a neutral acrylonitrile polymer, a copolymer composed of at least 85% by weight of acrylonitrile and a neutral vinyl monomer such as vinyl acetate can be mentioned. This copolymer is used for the purposes of increasing the heat stability of fibers prepared from the acid dye dyeable acrylonitrile copolymer of this invention, and it is required to have excellent heat stability itself. Therefore, generally, the content of the neutral vinyl monomer is within 15% by weight.

The acid dye dyeable acrylonitrile copolymer of this invention can be prepared by applying a conventional polymerization method for acrylonitrile. That is to say, the polymerization can be carried out using the suspension, solution or emulsion method at 20 to 80° C., preferably 40 to 60° C., in an aqueous medium or in an organic solvent such as benzene, toluene, dimethyl formamide, dimethyl acetamide or dimethyl sulfoxide, using a conventional radical polymerization initiator such as the persulfates, redox catalysts formed between the persulfates and sulfurous acid or its salts, or redox catalysts formed between the chlorates and sulfurous acid or its salts, a peroxide such as benzoyl peroxide, or an azo compound such as azobisisobutyronitrile. It may be performed batchwise, semibatchwise or continuously.

The polymerization yield and the degree of polymerization of the resulting polymer are greatly affected by the pH of the polymerization medium. Especially when the polymerization is carried out in an aqueous medium using the above-described redox catalysts, it is generally necessary to maintain the pH of the polymerization medium at not higher than 5 in view of the pH dependence on the decomposability of the catalyst. Preferably, the pH should be maintained between 2 and 4.

For this purpose, an excess amount of an acidic substance, such as an inorganic acid, for example, sulfuric acid, nitric acid, phosphoric acid or hydrochloric acid, or organic acid, for example, formic acid, acetic or propionic acid, is added to the polymerization medium. It is often preferable to add an emulsifier in order to improve the polymerizability of the monomers. It has been found that especially in the case of the present invention, anionic surface active agents are effective for increasing the conversion or the degree of polymerization (expressed by the specific viscosity). Such anionic surface active agents include the salts of fatty acids, sulfuric acid esters of higher alcohols, sulfuric acid esters of higher liquid fatty oils, sulfuric acid esters of aliphatic amines or aliphatic amides, sulfonic acid salts of dibasic fatty acid esters, sulfonic acid salts of fatty acid amides, and alkyl aryl sulfonates as disclosed in U.S. Pat. Nos. 2,436,926; 2,537,051; 2,628,223; 2,654,731; 2,700,034; 2,751,374; and 2,775,567. Furthermore, the rate of polymerization and the molecular weight of the polymer can be controlled by using a very small amount of a polymerization regulator such as a mercaptan, iso-propyl alcohol, tert-butyl alcohol or acetaldehyde. It may often be desirable to add a suitable amount of a salt such as sodium sulfate in order to obtain polymer particles of suitable sizes in the aqueous polymerization medium, as disclosed in Japanese Patent Publication No. 5,136/58 or 27,814/71.

The general method of feeding the monomers for the preparation of the acid dye dyeable copolymer of this invention is to introduce the theoretical amounts of acrylonitrile, the amino group containing monomer and the quaternary ammonium salt containing monomer prepared in advance, and if desired a neutral vinyl monomer, separately or as a mixture into a polymerization zone. The monomer feeding operation in the present invention can be performed with good efficiency and commercial advantage by utilizing the properties of dimethyl sulfate or diethyl sulfate as a strong alkylating agent. In other words, dimethyl sulfate or diethyl sulfate can be added to a mixture of the calculated amounts of acrylonitrile and the amino group containing monomer and if desired, the neutral vinyl monomer in an amount of 0.3 to 0.8 times based on the molar amount of the amino group containing monomer at low temperatures of −10° C. to 30° C., preferably not higher than 30° C., and after a thorough mixing, the resulting mixture can be directly fed into the polymerization zone. Using this mixing operation, the quaternary ammonium salt containing monomer of the amino group containing monomer is formed quantitatively, and by controlling the polymerization property, e.g., in terms of the temperature, pH and water/monomer ratio, the intended acid dye dyeable acrylonitrile copolymer of this invention can be obtained. Since the polymerization utility of acrylonitrile is lower than the amino group containing monomer plus the quaternary ammonium salt containing monomer, the amount of acrylonitrile, based on the monomeric mixture, is adjusted to at least 80% by weight at the time of feeding the monomers. This method obviates the need for a step of preparing the quaternary ammonium salt containing monomer in advance, and is economically very advantageous. This is one of the characteristic features of the present invention.

The acid dye dyeable copolymer can be spun into fibers by any of the wet, dry and dry-wet methods, for example, as disclosed in U.S. Pat. Nos. 2,614,289; 2,975,022; 3,080,-210; and 3,547,763. But as stated previously, the spinning of a mixture of the acid dye dyeable copolymer and a conventional neutral acrylonitrile polymer or a mixture of a solution of the acid dye dyeable copolymer and a solution of the neutral acrylonitrile polymer is more advantageous in order to obtain fibers having increased heat stability, reduced coloration and excellent physical properties. The blending ratio between the acid dye dyeable copolymer and the neutral acrylonitrile polymer is such that the total proportion of the amino group containing monomer plus the quaternary ammonium salt containing monomer becomes 100 to 700 mmols/kg. of the blend. Within this blending range ratio, the miscibility of the acid dyeable acrylonitrile copolymer and the neutral acrylonitrile polymer is extremely good, and no difficulty occurs in the spinning process.

As a solvent for the polymer, organic solvents such as dimethyl formamide, dimethyl acetamide, dimethyl sulfoxide or γ-butyrolactone, or concentrated aqueous solutions of zinc chloride, sodium rhodanate, or nitric acid, etc. are used. These solvents are commonly used as solvent for acrylonitrile copolymers.

The spun fibers are subjected to after treatments such as washing, drawing or heat-treatment using customary techniques, for example, as disclosed in U.S. Pat. Nos. 2,445,042; 3,124,631; 3,449,485; 3,523,150; and 3,558,765. Sometimes, a treatment for preventing a coloration of the fibers is performed at some point from the spinning solution to the final fibers. For example, an anti-coloring agent can be added to a spinning solution, or wet fibers before drying can be treated with this agent. Examples of suitable anti-coloring agents are acidic substances, such as sulfuric acid and succinic acid, phosphorus compounds such as phosphoric acid, phophorous acid and hydrophosphorous acid, or other metal compounds.

Fibers obtained by spinning the acid dye dyeable copolymer or a blend of the acid dye dyeable acrylonitrile copolymer and the neutral acrylonitrile of this invention contain 100 to 1,000 mmols/kg. of dyeable groups, and can be dyed intensely with all acid dyes which are usually used for dyeing wool and the like. Furthermore, as previously described, acrylic fibers containing the quaternary ammonium salt containing monomer as specified in the present invention have a dyeability which is less dependent upon the pH of the dye bath than acrylic fibers containing only the basic amino group containing monomer, and possess excellent practical features.

As a further advantage of this invention, the following dyeing properties can be described. In the case of a polymer obtained by polymerization in an aqueous medium using a persulfate or its redox catalyst comprising a persulfate or sulfurous acid or its salt as one component, acid groups dyeable with a cationic dye are introduced as the terminal groups of polymer. However, in the fibers of this invention, the quaternary ammonium salt present in the fibers ionically blocks the terminal acid groups, and completely inhibits the cationic dyeability of the fibers in the actual dyeing operation. This is very advantageous in a dyeing operation when the fibers are subjected to different color dyeing together with other cation dyeable fibers.

The most superior characteristic of the present invention is that the amount of the quaternary ammonium salt is limited to the specific range in order to inhibit a considerable deterioration in heat stability of an acrylonitrile copolymer or fibers thereof as a result of its introduction. In addition, the copolymer and fibers thereof in accordance with this invention exhibit a marked improvement in heat stability in comparison with an acrylonitrile copolymer or the fibers thereof in which only this quaternary ammonium base containing monomer is introduced in the same amount as specified in this invention.

These properties appear to be greatly affected by such factors as the monomer composition distribution of the copolymer. In any case, it is surprising that these properties are developed only with an acrylonitrile copolymer containing both the amino group containing monomer and the quaternary ammonium salt containing monomer fibers thereof. The excellent properties of the fibers of this invention are obtained by starting from the step of preparing the acid dye dyeable acrylonitrile copolymer. However, similar effects to the above can also be expected by spinning a mixture of (1) an acrylonitrile copolymer containing the basic amino group monomer and (2) an acrylonitrile copolymer containing the quaternary ammonium salt thereof containing monomer which have been prepared separately, or a mixture of this mixture of (1) and (2) with the neutral acrylic polymer described above. However, these similar effects are less outstanding than those obtained with fibers of an acrylonitrile copolymer containing units both from the amino group containing monomer, and quaternary ammonium salt containing monomer and the conjoint presence of units derived from these monomers in the acid dye dyeable acrylonitrile copolymer or the fibers predominantly accomplishes these excellent advantages.

The characteristic features and advantages of the present invention will be illustrated in greater detail by reference to the following Examples which are given for the purposes of illustration and are in no way intended to limit the scope of the invention. Unless otherwise indicated all parts and percents are by weight. In the examples and tables given herein after, for brevity the amino group containing monomer will be designated in some instances by "X" and the quaternary ammonium salt containing monomer will be designated in some instances by "Y."

The specific evaluations indicated in the Examples were made by the following methods.

(1) Whiteness of Fibers

The refractive index of light on the surfaces of the fibers was measured using a Hitachi self-recording spectrophotometer (model EPU-2). The whiteness is expressed by the percentage (PI percent) based on the refractive index of a white plate of magnesium oxide which is assumed to be 100. When PI (percent) is equal to 100, the whiteness is at a maximum.

(2) Heat Stability of Whiteness

After treatment of the fibers with dry heat, wet heat or steam at 130° C. for 60 minutes in each case, the sample was dried in air at room temperature and its whiteness was measured. The decrease in whiteness from the value before the heat-treatment is expressed by a $\Delta$PI (percent). With a larger $\Delta$PI, the heat stability is lower.

(3) Dyeability With Acid Dyes (3)-1: Saturated amount of exhaustion: Under the following conditions, the saturated amount of exhaustion of the dye of fiber or film was measured.

Dye: Kayaku Acid Orange II (C.I. Acid Orange 7)
pH: 2
Concentration of the dye: 1 g./liter
Goods-to-liquor ration: 1:900
Temperature: 100° C.
Dyeing time: 24 hours.

The sample was dyed using the Kayaku Acid Orange II, and then soaped under the following conditions, followed by washing with water. The dyed sample was dissolved in dimethyl sulfoxide, and the absorbance of this solution was measured. The amount of exhaustion is calculated from the calibration curve. This saturated amount of exhaustion is expressed in millimols/kg. It is known that in the case of acrylic fibers, the saturated amount of exhaustion corresponds to the absolute quantity of dyeable groups.

Soaping conditions:
Scourol #400: 1.0% (on the weight of fiber, O.W.F.)
Ammonia: 0.25% (O.W.F.)
Goods-to liquor ratio: 1:50.

(3)-2: Percentage exhaustion:
Dye: Kayaku Acid Orange II (C.I. Acid Orange 7) 5% O.W.F.
Goods-to-liquor ratio: 1:50
Temperature: 100° C.
Time: 120 minutes
pH of bath: 2-8 (using a universal buffer solution adjusted with phosphoric acid, boric acid, glacial acetic acid or sodium hydroxide).

After dyeing and soaping in the same way as described in (3)-1 above, the amount of exhaustion was measured in the same way as described in (3)-1.

(4) Dyeability With Cationic Dyes

Under the following conditions, the percentage exhaustion of the cationic dye of a fiber or film was measured, and used as to represent the cation dyeability.

Dye: Deorlene Blue 5G (C.I. Basic Blue 3) 5% O.W.F.
Goods-to-liquor ratio: 1:50
Temperature: 100° C.
Time: 120 minutes
pH of dye bath: 4.5 (adjusted with acetic acid and sodium acetate).

The percentage exhaustion was measured in the same way as in (3)-1.

Example 1

(A) A continuous polymerization tank equipped with a stirrer was charged with 50 parts of water whose pH had been adjusted to 3 with sulfuric acid. The jacket was maintained at 55° C., and the inside of the polymerization tank was purged with nitrogen gas. The polymerization tank was then charged continuously with 40 parts of pure water, a mixture obtained by intimately mixing at 20° C. 0.68 part of dimethyl sulfate (DMS) with a pre-mixture of 17.22 parts of acrylonitrile (AN), 0.4 part of vinyl acetate (VAc) and 1.7 parts of dimethyl aminoethyl methacrylate (DMAEM)

(AN/VAc/DMAEM/DMS=86.1/2.0/8.5/3.4 weight percent), 13.3 parts of an aqueous solution containing 0.16 part of sodium chlorate, 13.3 parts of an aqueous solution containing 0.4 part (corresponding to 2.5 molar times the amount of the sodium chlorate) of acidic sodium bisulfite, and 13.3 parts of a 1.5% aqueous sulfuric acid solution from separate feed pipes, and copolymerization was conducted. The average residence time was 70 minutes.

The resulting polymer was withdrawn continuously washed with water, and dried in hot air at 70° C. The pH of the polymerization medium was maintained at 2.5, and the polymerization temperature was maintained always at 50° C.±0.5° C. by adjusting the temperature of water flowing in the jacket.

The continuous copolymerization was carried out under quite the same conditions as above except that the amount of dimthyl sulfate was changed, and the copolymer was withdrawn continuously. The results obtained are shown in Table 1.

TABLE 1

| Run number | Composition of monomers (wt. percent) | | | | DMS/ DMAEM (mole ratio) | X/Y | Average | | Dyeability (mmols/kg.) |
| | AN | VAc | DMAEM | DMS | | | Conversion (percent) | Specific viscosity | |
| --- | --- | --- | --- | --- | --- | --- | --- | --- | --- |
| 1 | 86.1 | 2.0 | 8.5 | 3.4 | 0.5 | 1.0 | 75.8 | 0.10 | 504 |
| 2 | 89.5 | 2.0 | 8.5 | 0 | 0 | | 75.3 | 0.152 | 498 |
| 3 | 87.1 | 2.0 | 8.5 | 2.4 | 0.3 | 2.33 | 77.0 | 0.147 | 500 |
| 4 | 85.06 | 1.0 | 8.5 | 5.44 | 0.8 | 0.25 | 74.2 | 0.148 | 508 |
| 5 | 84.38 | 1.0 | 8.5 | 6.12 | 0.9 | 0.11 | 74.7 | 0.140 | 503 |
| 6 | 83.7 | 1.0 | 8.5 | 6.8 | 1.0 | 0 | 75.4 | 0.138 | 500 |

NOTES:
1. The average specific viscosity was measured at 25° C. with respect to a solution of 0.1 g. of copolymer in 100 cc. of a 0.1 N sodium rhodanate solution in dimethyl formamide (this will apply hereinafter.
2. The average dyeability is the saturated amount of an acid dye absorbed by a 20μ thick film obtained from the copolymer.
3. Run numbers 1, 3 and 4 relate to the preparation of acid dyeable copolymers of this invention, and Run numbers 2, 5 and 6 are for comparison.

(B) By the same method as described above, the continuous copolymerization was conducted by feeding an aqueous solution of a quaternary ammonium base containing monomer (DM-DMS) obtained by quaternizing DMAEM with DMS. The monomeric mixture used contained 16.54 parts of AN, 0.4 part of VAc and 3.06 parts of DM-DMS (AN/VAc/DM-DMS=82.7/2.0/15.3 weight percent). The difference from the above-described procedure was that the aqueous sulfuric acid was not used, but 13.3 parts of water was added to the water used for feeding the DM-DMS. The results obtained are as follows:

| Run No. | Composition of monomers (wt. percent) | | | Average Conversion (percent) | Specific viscosity | Dyeability (mmols/kg.) |
|---|---|---|---|---|---|---|
| | AN | VAc | DM-DMS | | | |
| 7 | 82.7 | 2.0 | 15.3 | 74.5 | 0.141 | 500 |

In this case, DM-DMS was an adduct (mol ratio of 1:1), and the polymerization conditions corresponded to those used in Run No. 6 (comparison).

(C) After each of the copolymers obtained in Runs Nos. 1 to 7 was spun, and the fibers obtained were subjected to the after-treatments according to the methods to be described below, and the acid dyeability, whiteness and heat stability of the fiber were evaluated.

The copolymer was dissolved in dimethyl acetamide with stirring for one hour at 80° C. to form a 25% spinning solution which was maintained at 50° C. The spinning solution was extruded into a 50% aqueous dimethyl acetamide solution at 40° C. from a spinning nozzle having 200 orifices, each with a diameter of 0.075 mm. The filaments otbained were drawn to 5 times while being washed with boiling water. After oiling, the filaments were dried for one minute on a hot roller held at 130° C., and then heat-treated in the relaxed state in superheated steam at 2.5 kg./cm.²-g. for 10 minutes. Finally, a filament tow (about 600 denier/200 filaments) was produced.

The whiteness, heat stability and tenacity and elongation (20° C., 65% RH) of the resulting fibers are shown in Table 2. The properties of comparative fibers (A) obtained from a comparative copolymer (specific viscosity 0.158) composed of 93% by weight of acrylonitrile and 7% by weight of vinyl acetate are also shown in Table 2.

It can be seen from the results shown in Table 2 that all of the fibers of the copolymers have a tenacity and an elongation comparable to those of conventional acrylic fibers, but that when more than 0.8 times the amount of DMAEM of DMS on a molar basis is used, the whiteness and heat stability of the resulting fibers are markedly reduced, and the fibers are considerably yellowish brown colored. In Runs Nos. 6 and 7, the method of introducing the dyeable monomer into the polymerization tank is different, but the composition of monomers is apparently the same, and the properties of the fibers along with their dyeability shown in Table 3 coincide.

Table 3 shows the dyeability of the fibers obtained.

TABLE 3

| | DMS/ DMAEM (mol ratio) | Saturated amount of exhaustion (mmols/kg. of film) | Dyeability with acid dyes (percent exhaustion) pH of— | | | | | | Cation dyeability (percent) |
|---|---|---|---|---|---|---|---|---|---|
| | | | 2 | 3 | 4 | 5 | 6 | 7 | |
| Run number: | | | | | | | | | |
| 2 | 0 | 514 | 99.9 | 93.7 | 82.7 | 47.8 | 19.5 | 10.7 | 14.5 |
| 3* | 0.3 | 507 | 99.8 | 94.1 | 86.7 | 64.3 | 44.8 | 35.9 | 0 |
| 1* | 0.5 | 506 | 99.9 | 98.7 | 95.4 | 90.7 | 74.7 | 66.8 | 0 |
| 4* | 0.8 | 503 | 99.9 | 99.1 | 96.3 | 89.7 | 85.4 | 80.7 | 0 |
| 5 | 0.9 | 511 | 99.8 | 99.0 | 98.3 | 92.4 | 87.6 | 82.3 | 0 |
| 6 | 1.0 | 508 | 99.9 | 99.2 | 99.0 | 97.6 | 94.3 | 86.7 | 0 |
| 7 | (1.0) | 503 | 99.9 | 99.6 | 99.0 | 98.1 | 93.7 | 87.5 | 0 |
| Comparative fiber: | | | | | | | | | |
| (A) | | 0 | | | | | | | 75.8 |
| (B) (wool) | | 610 | 99.8 | 94.2 | 84.3 | 53.7 | 25.2 | 10.3 | 28.5 |

*Fibers of this invention.

These fibers contained about 500 mmols/kg. of groups dyeable with acid dyes, and it can be said that the polymerization utility of the tertiary amino group containing monomer (DMAEM) and quaternary ammonium salt containing monomer (DM-DMS) are almost the same.

As is clear from these data, the pH dependence of the dye exhaustion decreases with increasing proportion of DMS used, that is, with increasing amounts of the quaternary ammonium salt containing monomer introduced. When the DMAEM is entirely converted to the DM-DMS, the dye exhaustion no longer depends upon the pH of the dye bath. By utilizing DMS in the minimum amount specified in this invention (0.3 times based on DMAEM on a molar basis), fibers which cannot be dyed with cationic dyes at all can be obtained.

For comparison, Table 3 shows the pH dependence of the dyeability of wool (comparative fibers (B)), and it can be seen that better dyeability than wool surely can be achieved by using at least 0.3 times the amount of DMAEM of DMS on a molar basis. In other words, it can be seen that in order to reduce this pH dependence, dyeable groups of the quaternary ammonium base type are required, and the amount thereof evidently is restricted by virtue of the maintenance of good whiteness and heat stability of the fibers.

Example 2

Each of the copolymers obtained in Runs Nos. 1, 2 and 6 in Example 1 was mixed with a conventional neutral acrylonitrile copolymer using the method to be described below respectively. The mixtures were spun, and the fibers obtained were subjected to after-treatments.

40 parts of the copolymer obtained in Run No. 1 in Example 1 was thoroughly mixed in the powdery state

TABLE 2

| | DMS/ DMAEM (mol ratio) | Whiteness and whiteness heat stability | | | | Dry tenacity (g./d.) | Dry elongation (percent) |
|---|---|---|---|---|---|---|---|
| | | Original color (PI) | Dry heat (ΔPI) | Wet heat (ΔPI) | Steam (ΔPI) | | |
| Run number: | | | | | | | |
| 2 | 0 | 83.5 | 8.7 | 1.4 | 0.7 | 2.35 | 41.7 |
| 3* | 0.3 | 83.0 | 8.4 | 2.3 | 2.3 | 2.41 | 40.8 |
| 1* | 0.5 | 83.7 | 9.6 | 3.1 | 1.5 | 2.39 | 43.2 |
| 4* | 0.8 | 82.8 | 10.3 | 4.3 | 2.6 | 2.37 | 44.1 |
| 5 | 0.9 | 74.6 | 19.4 | 10.3 | 8.7 | 2.40 | 40.7 |
| 6 | 1.0 | 65.3 | 20.8 | 14.3 | 10.8 | 2.35 | 42.3 |
| 7 | (1.0) | 64.8 | 21.3 | 13.7 | 12.4 | 2.40 | 43.5 |
| Comparative fiber (A) | | 94.4 | 1.3 | 1.7 | 2.3 | 2.42 | 43.8 |

*Fibers of this invention.

with 60 parts of a copolymer (comparative polymer used in Example 1). The mixture was dissolved in 335 parts of dimethyl acetamide at 80° C. over a period of one hour, and then maintained at 50° C. for use as a spinning solution. The spinning solution was very uniform, and remained stable even when allowed to stand for a long period of time. Fibers (about 3 filamentary denier) were prepared from the spinning solution in quite the same way as set forth in Example 1.

Using the same procedure as described above, fibers were produced from the copolymers of Runs Nos. 2 and 6.

The whiteness, whiteness heat stability, and dyeability of the resulting fibers are shown in Table 4. The tenacity and elongation of the fibers in the standard condition (20° C. x 65% RH) are also shown in Table 4.

TABLE 4

| Copolymer of run number | Whiteness and whiteness heat stability | | | | Dyeability | | Fiber properties | | |
|---|---|---|---|---|---|---|---|---|---|
| | Original color (PI) | Dry heat (ΔPI) | Wet heat (ΔPI) | Steam (ΔPI) | Amount of saturated exhaustion of acid dye (mmols/kg.) | Percent exhaustion of cationic dye | Denier | Dry tenacity (g./d.) | Dry Elongation (percent) |
| 1* | 91.4 | 6.4 | 3.2 | 2.8 | 200 | 0 | 3.03 | 2.45 | 44.6 |
| 2 | 92.3 | 5.8 | 3.4 | 1.4 | 197 | 27.1 | 2.98 | 2.38 | 45.2 |
| 6 | 75.4 | 11.9 | 6.4 | 5.7 | 203 | 0 | 3.14 | 2.35 | 44.0 |

*Fibers of the present invention.

It can be seen from Table 4 that all of these fibers have substantially the same fiber properties comparable to those of the fibers prepared from the copolymer alone in Example 1. On the other hand, the cation dyeability of the comparative fibers (A) in Example 1 (fibers of the neutral acrylonitrile copolymer) is quite absent in the fibers prepared by spinning a blend of the neutral copolymer with the copolymer of this invention (Run No. 1). Furthermore, as can be seen from Table 4, the acid dyeability of the fibers is correctly determined by the amount of the acid dyeable groups, and is not reduced by the blending procedure. Accordingly, it is possible to remove the staining by cationic dyes by the blending procedure. It is clear that these fibers obtained from the copolymer blend have outstandingly improved heat stability, and therefore have high whiteness and excellent quality. On the contrary, this blending effect is not great with the copolymer obtained in Run No. 6 (all of the dyeable groups are of a quaternary ammonium base), and so such a copolymer has a low commercial value.

Example 3

A continuous polymerization kettle equipped with a stirrer was maintained at 55° C. using a water jacket. While purging the inside of the kettle thoroughly with nitrogen gas, appropriate amounts of a monomer mixture, a polymerization initiator, sulfuric acid, an emulsifier, and water were fed continuously from separate feed pipes so that the average residence time in the kettle was 60 minutes. The resulting copolymer was continuously withdrawn, washed with water and dried.

The substances introduced into the polymerization kettle were as follows:

Feed 1: Monomeric mixture AN/methyl acrylate (MA)/ X/DMS=87.4/5.0/6.0/1.6 (weight percent)

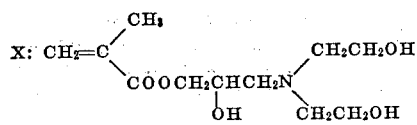

Feed 2: Oxidizing agent (aqueous solution of potassium persulfate) as a redox catalyst.
Feed 3: Reducing agent (aqueous solution of sodium bisulfite) as a redox catalyst.
Note.—(1) The amount of potassium persulfate was 0.8% based on the weight of the monomer mixture. (2) The amount of sodium bisulfate is such that the molar ratio of persulfate/bisulfate=1/3.
Feed 4: 1.5% aqueous sulfuric acid solution.
Feed 5: 1.5% aqueous solution of sodium laurylsulfate (2% based on the weight of the monomers).
Note.—The weight ratio of the amount of total water to the amounts of the monomers is 4:1.

An appropriate amount of sulfuric acid was fed so as to adjust the pH of the polymerization medium to 3.0. The polymerization temperature was maintained at 50±0.5° C.

by adjusting the temperature of the water flowing in the jacket. The specific viscosity of the resulting polymer and the average conversions of the monomers were measured with the passage of time, and the condition of the resulting polymers was observed at the time when the polymerization reached a steady state.

Next, the copolymerization was carried out in quite the same way as described above except that the sodium laurylsulfate was not added. The results obtained are shown in Table 5.

TABLE 5

| Run number | Sodium laurylsulfate | Average Conversion (percent) | Specific viscosity | Saturated amount of exhaustion of acid dye (mmols/kg.) | Condition of the polymers |
|---|---|---|---|---|---|
| 8 | Added | 81.5 | 0.150 | 203 | Good. |
| 9 | Not added | 64.3 | 0.148 | 165 | Ultra-fine polymer particles. |

With the addition of sodium laurylsulfate, the polymer was obtained in the form of suitably fine particles, and the flowability of the polymer slurry obtained was exceedingly good. The polymerization yield was also at a satisfactory level.

In contrast, when sodium laurylsulfate was not added, the polymer particles were fine, and the polymer slurry became viscous, which resulted in a slight reduction in operability on filtration and water-washing, etc. of the resulting polymer. It can be seen from the results shown in Table 5 that the copolymer obtained in Run No. 9 had inferior dyeability with acid dyes, as determined with respect to a film (about 20μ thick) of the polymer, to the copolymer obtained using the emulsifier, showing that the polymerization utility of the dyeable monomers is rather low.

It can be said from the above results that the effect of an anionic surface active agent is great in the commercial production of acid dyeable copolymers of acrylonitrile.

EXAMPLE 4

Using the procedure as described in Example 1, the copolymerization was performed while continuously feeding a mixture obtained by adding 1.1 parts of diethyl sulfate (DES) at 20° C. to 20 parts of a pre-mixture of 87% by weight of acrylonitrile, 3% by weight of methyl acrylate and 10% by weight of dimethylaminopropyl methacrylamide (DMPA), 13.3 parts of an aqueous solution containing 0.2 part of sodium chlorate, 13.3 parts of an aqueous solution containing 0.46 part (corresponding to 2.3 times the amount of the sodium chlorate on a molar basis) of sodium bisulfite, and 13.3 parts of a 1.75% aqueous solution of sulfuric acid from separate feed pipes. The polymerization temperature was

50° C.±0.5° C., using quite the same method as described in Example 2, respectively.

For comparison, the above-described neutral acrylonitrile copolymer itself was spun into fibers.

The properties of these fibers were measured, and the results are shown in Tables 7 and 8 below.

TABLE 7

| | Amount of acid dye exhausted (mmols/kg.) | Percent exhaustion of a cationic dye | Percent exhaustion of acid dye pH of— | | | | | |
|---|---|---|---|---|---|---|---|---|
| | | | 2 | 3 | 4 | 5 | 7 | 8 |
| Run No.: | | | | | | | | |
| 10* | 203 | 0 | 99.5 | 99.0 | 95.3 | 87.6 | 65.4 | 53.2 |
| 11 | 214 | 19.5 | 98.5 | 94.1 | 87.6 | 55.4 | 10.1 | (¹) |
| Comparison | 0 | 70.5 | | | Not dyed | | | |

¹ Slightly stained.
*Present invention.

TABLE 8

| | Whiteness | | | | Fiber properties | | | |
|---|---|---|---|---|---|---|---|---|
| | Original color (PI) | Dry heat (ΔPI) | Wet heat (ΔPI) | Steam (ΔPI) | Denier | Dry tenacity (g./d.) | Dry elongation (percent) | Dry knot strength (g./d.) |
| Run No.: | | | | | | | | |
| 10* | 87.5 | 6.3 | 4.7 | 4.4 | 3.04 | 2.45 | 42.7 | 1.87 |
| 11 | 89.3 | 5.4 | 3.5 | 4.0 | 2.98 | 2.38 | 43.1 | 1.92 |
| Comparison | 94.3 | 2.4 | 3.5 | 3.9 | 2.97 | 2.44 | 43.5 | 1.85 |

*Present invention.

and the pH of the polymerization medium was maintained at 2.0 (Run No. 10).

The above procedure was repeated except that DES was not added. In this case, only the amount of sulfuric acid was changed so as to adjust the pH of the polymerization medium to 2.0. (Runs No. 11).

When the polymerization reached a steady state over a long-period of operation, these two runs were compared with each other. The results obtained are given in Table 6.

TABLE 6

| Run No. | Amount of DES (mol ratio) | Average Conversion (percent) | Specific viscosity | State of polymerization | Amount of exhaustion of acid dye (mmols/kg.)¹ | Cation Dye exhaustion (percent)² |
|---|---|---|---|---|---|---|
| 10* | DES/DMPA=0.6 | 75.4 | 0.148 | Good | 518 | 0 |
| 11 | None | 74.8 | 0.145 | do | 524 | 10.4 |

¹ Saturated amount of dye exhaustion of the copolymer film.
² Percentage dye exhaustion of the copolymer film.
*Present invention.

As is shown in Table 6, the state of polymerization and the polymerization utility of the dyeable monomer as calculated from the acid dyeability were substantially the same for both. In other words, this means that without deteriorating the acid dyeability, staining by cationic dyes can be inhibited by quaternizing a part of the basic monomer with DES in accordance with this invention. The method of quaternization and the method of introducing the quaternized product into the copolymer are quite simple, and they present great commercial advantage in conjunction with the improved dyeability to be described.

EXAMPLE 5

Each of the copolymers obtained in Runs Nos. 10 and 11 in Example 4 was mixed with a conventional neutral acrylonitrile copolymer, and spun into fibers, respectively.

40 parts of the copolymers were mixed with 60 parts of a copolymer (specific viscosity 0.155) of 94% by weight acrylonitrile and 6% by weight methyl acrylate, and the mixtures were dissolved in 340 parts of dimethyl acetamide under stirring for 1 hour at 80° C. The solutions were maintained at 50° C. for use as a spinning solution, and spun into fibers (about 600 denier/200)

It can be seen from the results contained in Tables 7 and 8 that the fibers obtained from a blend of the copolymer obtained using DES specified in the present invention with the neutral acrylonitrile copolymer have a reduced pH dependence with respect to acid dyeability without a deterioration in their fiber properties. These fibers can be dyed well with acid dyes over a pH range of from 2 to 8, and the dyeings obtained had very high fastness characteristics. Acid Orange II is inherently active at the low acidity side, and the results of the dyeability test shown in Table 7 (Run No. 10) are very good.

On the other hand, the whiteness of the fibers of this invention hardly decreased in comparison with that of the fibers obtained from the copolymer of Run No. 1 which contains only the amino group containing copolymer, and has a heat stability approximately that possessed by the fibers of the neutral acrylonitrile copolymer (comparison). Such fibers as in this example are very superior as commercial products.

EXAMPLE 6

A continuous polymerization tank equipped with a stirrer was charged with 50 parts of water whose pH had been adjusted with sulfuric acid to 2.5. The jacket was maintained at 52° C., and the inside of the tank was purged with nitrogen gas. The polymerization tank was charged continuously with the following monomers, redox catalyst and sulfuric acid from separate feed pipes so that the average residence time was 70 minutes. The polymerization temperature was maintained at 50° C.±0.5° C., and the pH of the polymerization medium was adjusted to 2.5. The resulting polymer was withdrawn continuously, washed with water, and dried.

The amounts of the monomers fed are shown as follows:

Run No. 12

| Feed 1: Pure water | Parts |
|---|---|
| | 40 |

Feed 2: Monomeric mixture (20 parts):

| | Parts |
|---|---|
| Acrylonitrile (AN) | 17.94 |
| Diethylaminoethyl methacrylate (DEAEM) | 0.64 |
| Vinyl acetate (VAc) | 1.20 |
| Dimethyl sulfate (DMS) | 0.22 |

(AN/VAc/DEAEM/DMS=89.7/6.0/3.2/1.1 weight percent)

| | Parts |
|---|---|
| Feed 3: Aqueous solution containing 0.14 part of sodium chlorate | 13.3 |
| Feed 4: Aqueous solution containing 0.42 part of sodium bisulfite | 13.3 |
| Feed 5: Aqueous sulfuric acid solution (0.79%) | 13.3 |

Run No. 13

The following changes were made in Run No. 12.

Feed 2: Monomeric mixture (20 parts):

| | Parts |
|---|---|
| Acrylonitrile | 15.6 |
| Diethylaminoethyl methacrylate | 3.3 |
| Dimethyl sulfate | 1.1 |

(AN/DEAEM/DMS=77.9/16.5/5.6 weight percent)

| | Parts |
|---|---|
| Feed 5: Aqueous sulfuric acid solution (3.3%) | 13.3 |

With the progress of polymerization, a white polymer in the form of fine particles was precipitated.

In Run No. 13 wherein the amount of the amino group containing monomer was large, the polymer particles were somewhat finer, and it was relatively difficult to perform filtration in order to recover the polymer.

Under the same conditions as described above, the copolymerization was performed by feeding a mixture (a) composed of 17.94 parts of acrylonitrile, 1.2 parts of vinyl acetate and 0.32 part of diethylaminoethyl methacrylate and (b) 5 parts of an aqueous solution of the reaction product of dimethyl sulfate (DEAEM-DMS) and diethylaminoethyl methacrylate from separate feed pipes (Run No. 14). The composition of the monomers corresponded to that in Run No. 12. (AN/VAc/DEAEM/DEAEM-DMS=89.7/6.0/1.6/2.7 weight percent). The state of polymerization was quite similar to that in Run No. 12, and the operability in filtration, washing with water, drying, etc. was very good.

The results obtained are given in Table 9.

TABLE 9

| Run No. | Average Conversion (percent) | Average Specific viscosity | Amount of acid dye exhausted (mmols/kg.)[1] | Percent exhaustion of cationic dye[1] | Polymerization utilizing rate of dyeable monomers (percent)[2] |
|---|---|---|---|---|---|
| 12 | 74.3 | 0.153 | 193 | 0 | 105 |
| 13 | 67.3 | 0.141 | 807 | 0 | 90 |
| 14 | 74.7 | 0.152 | 187 | 0 | 102 |

[1] Saturated amount of dye exhaustion in a film prepared from the copolymer.

[2] $\frac{\text{(Mols of dyeable groups in copolymer)}}{\text{(Mols of dyeable groups in monmers charged)}} \times 100$ (percent)

[3] Corresponding to the acid dyeability in Table 9.

As described before, no difference was observed which could be ascribed to any differences in the method of feeding. According to this invention, amino groups and quaternary ammonium base groups can be incorporated conjointly into the acrylonitrile copolymer without the need for preparing the quaternary ammonium base containing monomer (DEAEM-DMS) in advance by alkylating the amino group containing monomer as in Run No. 14.

On the other hand, as can be seen from the results of Run No. 13, when the amount of the amino group containing monomer becomes large, the polymerization yield, the specific viscosity of the polymer, and the polymerization utility of the dyeable monomer somewhat decrease.

Example 7

A mixture of 25 parts of the acid dyeable copolymer obtained in Run No. 13 in Example 6 and 75 parts of a neutral acrylonitrile copolymer consisting of 93% by weight acrylonitrile and 7% by weight of vinyl acetate was spun into fibers using the method described in Example 1 (Fiber 14).

Then, each of the copolymers obtained in Runs Nos. 12 and 14 was spun similarly to form Fibers 12 and 13, respectively.

In all of these cases, the spinning operation could be performed in good condition, and no difficulty occurred. The properties of the resulting fibers are shown in Tables 10 and 11.

TABLE 10

| Acid dyeable copolymer | Method of spinning | Saturated amount of acid dye exhaustion (mmols/kg.) | Percent exhaustion of cationic Dye | Percent exhaustion of acid dyes pH of— | | | | |
|---|---|---|---|---|---|---|---|---|
| | | | | 2 | 3 | 4 | 5 | 7 | 8 |
| 13 | Blend | 203 | 0 | 99.9 | 98.5 | 93.4 | 92.6 | 87.6 | 83.4 |
| 12 | Alone | 197 | 0 | 99.9 | 97.7 | 94.8 | 91.3 | 89.2 | 80.6 |
| 14 | do | 194 | 0 | 99.9 | 98.4 | 93.0 | 90.4 | 86.3 | 82.1 |

TABLE 11

| Acid dyeable copolymer | Method of spinning | Whiteness and whiteness heat stability | | | |
|---|---|---|---|---|---|
| | | Original color (PI) | Dry heat (ΔPI) | Wet heat (ΔPI) | Steam (ΔPI) |
| 13 | Blend | 92.4 | 3.8 | 2.7 | 2.9 |
| 12 | Alone | 84.4 | 7.3 | 4.5 | 4.0 |
| 14 | do | 84.8 | 7.9 | 5.1 | 3.9 |

As can be seen from the results shown in Tables 10 and 11, both the fibers prepared from a blended copolymer and those from the copolymer alone exhibited excellent dyeing properties. Specifically, they are not stained with cationic dyes, and can be dyed intensely with acid dyes over a broad pH range, and also exhibited excellent dyeing fastness. Fibers 12 and 14, as had been expected, had similar properties, and the method of incorporating the quaternizing agent into the monomeric mixture containing the amino group containing monomer before the polymerization step is more advantageous economically.

Using the copolymer (Run No. 13 of Example 6) having a high acid dyeability, a large proportion of the neutral acrylonitrile copolymer having a high heat stability can be blended with the acid dyeable copolymer, leading to a fiber having improved heat stabiilty as well as dyeability.

While the invention has been described in detail and in terms of specific embodiments thereof, it will be apparent that various changes and modifications can be made therein without departing from the spirit and scope thereof.

What is claimed is:

1. A polymer blend comprising:
   (1) the acid dye dyeable acrylonitrile copolymer which comprises:
      (A) at least 70% by weight of acrylonitrile;
      (B) an amino group containing monomer selected from the group consisting of the compounds represented by the formulae (I), (II), and (III)

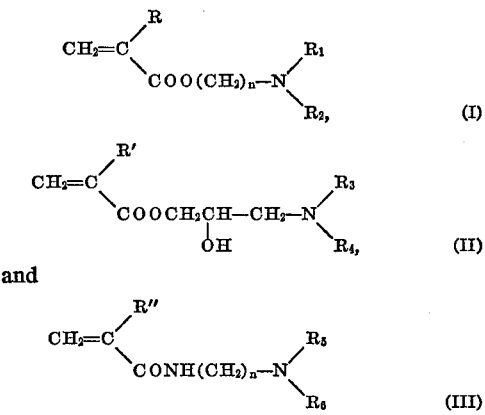

wherein R, R' and R'' are each selected from the group consisting of a hydrogen atom or a methyl group, $R_1$, $R_2$, $R_3$, $R_4$, $R_5$ and $R_6$ are each selected from from the group consisting of an alkyl group having 1 to 8 carbon atoms, inclusive, and an aralkyl group, having from 7 to 14 carbon atoms, inclusive, in which said alkyl or aralkyl groups may be substituted with at least one substituent selected from the group consisting of a cyano group and a hydroxy group and $n$ is an integer of 2 to 4 inclusive;

(C) a quaternary ammonium salt-containing monomer selected from the group consisting of the compounds represented by the formulae (I'), (II'), and (III')

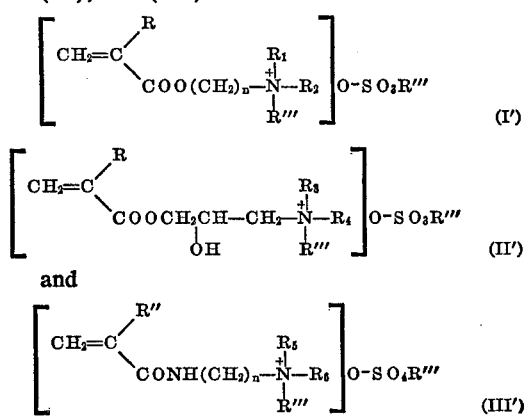

wherein R, R', R'', $R_1$, $R_2$, $R_3$, $R_4$, $R_5$ and $R_6$ are as above defined, and R''' is a methyl group or an ethyl group, the total proportion of said amino group containing monomer plus said quaternary ammonium salt containing monomer ranging from 100 to 1,000 mmoles per kilogram of said acid dye dyeable acrylonitrile copolymer and the molar ratio of said amino group containing monomer to said quaternary ammonium salt containing monomer ranging from 2.3 to 0.25; and (2) a neutral acrylonitrile polymer comprising greater than 85% by weight of acrylonitrile and at least one neutral vinyl monomer copolymerizable with acrylonitrile, wherein the total proportion of said amino group containing monomer plus acid quaternary ammonium salt containing monomer ranges from 100 to 700 mmoles per kilogram of said polymer blend.

2. The blend of Claim 1, wherein said copolymer additionally comprises up to 19.1% by weight of a neutral vinyl monomer copolymerizable with said acrylonitrile.

3. The blend of Claim 1, wherein said amino-group containing monomer has the formula (I), in which R is selected from the group consisting of a hydrogen atom and a methyl group, in which $R_1$ and $R_2$ are each selected from the group consisting of a methyl group and an ethyl group, and in which $n$ is 2.

4. The blend of Claim 1, wherein said R''' is methyl.

5. The blend of Claim 1, wherein said amino-group containing monomer is selected from the group consisting of dimethylaminoethyl methacrylate and diethylaminoethyl methacrylate, and wherein said quaternary ammonium salt-containing monomer is present in a proportion ranging from 50 to 300 mmoles per kilogram of said acid dye dyeable acrylonitrile copolymer.

6. The polymer blend according to Claim 1, wherein the total proportion of said amino group containing monomer and said quaternary ammonium salt containing monomer ranges from 400 to 800 mmoles per kilogram of said acid dye dyeable acrylonitrile copolymer and from 100 to 500 mmoles per kilogram of said polymer blend, and wherein the molar ratio of said amino group containing monomer to said quaternary ammonium salt containing monomer is 2.

7. A fiber comprising said polymer blend of Claim 1.

References Cited

UNITED STATES PATENTS 2,843,573   7/1958   Melamed _____ 260—86.1
2,723,256   11/1955  Hayek _____ 260—79.3

FOREIGN PATENTS 2,009,478   2/1970   Germany _____ 260—Dig. 18

MURRAY TILLMAN, Primary Examiner

C. J. SECCURO, Assistant Examiner

U.S. Cl. X.R.

260—Dig. 18, 23 AR, 80.6, 80.73, 85.52 A